United States Patent [19]

Hartman et al.

[11] Patent Number: 4,621,956
[45] Date of Patent: Nov. 11, 1986

[54] METHOD AND APPARATUS FOR CUTTING OF FLEXIBLE FOAM MATERIAL

[76] Inventors: Steven D. Hartman; H. David Hartman, both of 7676 Kimbel Street, Unit 18, Mississauga, Ont., Canada, L5S 1J8

[21] Appl. No.: 656,181

[22] Filed: Oct. 1, 1984

[51] Int. Cl.$^4$ .................................................. B23B 41/00
[52] U.S. Cl. ......................................... 408/1 R; 408/19; 408/22; 408/53; 408/125; 408/204
[58] Field of Search .................. 408/1 R, 22, 43, 44, 408/204, 19, 125, 53; 144/4; 83/862, 865

[56] References Cited

U.S. PATENT DOCUMENTS

| | | | |
|---|---|---|---|
| 300,784 | 6/1884 | Lucas | 408/125 |
| 2,751,941 | 6/1956 | Smith | 408/125 X |
| 3,207,191 | 9/1965 | Ervin | 408/22 X |

*Primary Examiner*—Z. R. Bilinsky

[57] ABSTRACT

An apparatus and process for the continuous cutting of a generally cylindrical rod from soft flexible polymeric foam slabs is disclosed. The apparatus includes a drive for moving a length of the foam slab along a predetermined path, a guide for restricting the movement of such foam slab to movement along said predetermined path, at least one rotary cutter having an open bore with the axis thereof generally along said predetermined path and in a position to continuously cut a rod from the thickness of such foam slab as it is moved past said cutter, a drive for rotating said at least one rotary cutter at a speed sufficient to cut such foam slab effectively as such foam is moved along said path, and an arrangement for positively withdrawing a cut rod from the cutter bore, the guide engages the foam slab adjacent the cutters and forces the slab to move past the cutters and in so doing the cutter slits the slab to allow such cut rod to continue along such path and allow the foam slab other than such rod to diverge from the path away from the at least one cutter. The apparatus and process allow convenient cutting of joint backer rods from soft flexible polymeric foam slabs (open celled).

16 Claims, 8 Drawing Figures

U.S. Patent Nov. 11, 1986 Sheet 1 of 3 4,621,956
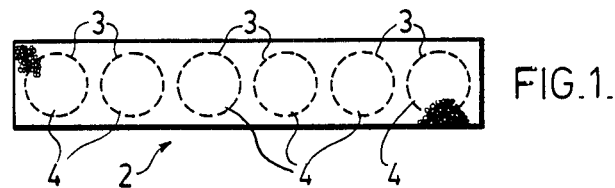
FIG.1.
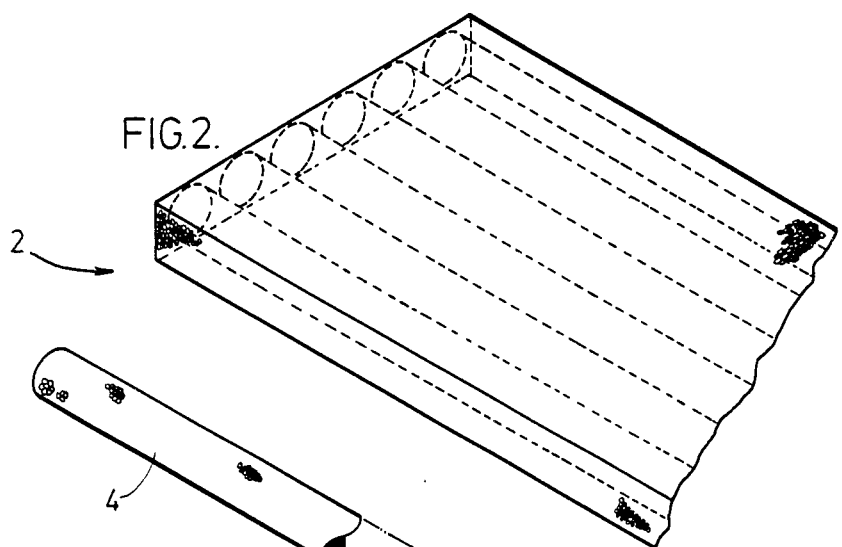
FIG.2.
FIG.3.
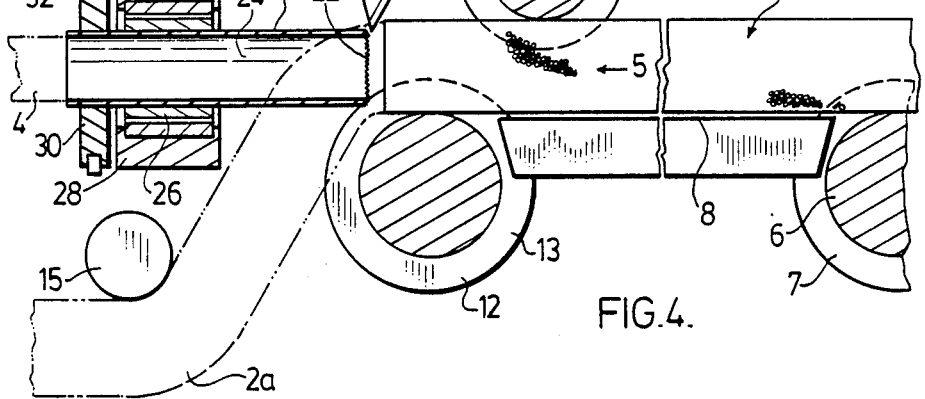
FIG.4.

METHOD AND APPARATUS FOR CUTTING OF FLEXIBLE FOAM MATERIAL

BACKGROUND OF THE INVENTION

This invention relates to an apparatus and method for cutting of sheets of soft flexible foam material into cylindrical type rods suitable for use in joint backing application. In particular, the invention relates to apparatus and method for cutting of soft flexible polymeric foam slabs to form long continuous lengths of cylindrical backing rods from the thickness of the foam as the slab is progressively moved past a cutting operation.

Cutting of soft flexible polymeric foam has proven difficult and attempts to extrude such foam into a particular shape have also proven unsatisfactory as a dense skin occurs. One method of forming particular shapes from foam slab is disclosed in U.S. Pat. No. 3,869,831, where shaper rollers grind the exterior surface of the foam to produce the particular shape. According to this patent, first one surface of the foam slab is shaped and then the foam is passed to a second station which does a similar operation to the opposite side. This apparatus has operated satisfactory, however it requires two separate cutting operations which must be controlled and aligned to assure the desired shape is achieved. It also results in substantial amounts of fine scrap as the surface has been ground.

It is also known from U.S. Pat. No. 3,009,848, to compress the sheet or block of soft plastic foam and cut it in a particular manner often with straight knives which upon release of the foam results in a particular shape being achieved which is different from the cutting knife. In this way, straight knives can be used which are obviously much simpler to control relative to specially shaped knives.

Other methods for producing cylindrical rods from block foam have used a long hot wire which is inserted in the foam and moved in a manner to cut the rod from the foam block. This is a batch process operation and results in fairly high manufacturing costs.

The cutting of soft flexible open cell polymeric foam remains a problem particularly due to the foam's resilent compression and elastic deformation resulting at least partially from the low density and causes shifting of the foam during cutting thereof. However, when the foam block or slab is properly guided and of sufficient thickness, it is fairly firm and it is only when much smaller widths of the foam are cut that it becomes fairly flexible. Therefore, the foam blocks or slabs have somewhat different characteristics than the individual cylindrical rods cut from the slab, caused by the reduced size.

SUMMARY OF THE INVENTION

The process according to the present invention, allows the continuous cutting of a generally cylindrical rod from soft flexible polymeric open called foam slabs which have been previously produced probably on a batch basis. The prcess includes moving a foam slab along a predetermined path towards a high speed rotary knife having a bore parallel to the axis thereof and placed with the axis generally parallel to the predetermined path such that the knife is within the thickness of such slab. The foam is cut with the rotary knife to form cylindrical rods which pass through the bore of the knife and separate from the remaining portion of such foam slab. The rods are engaged downstream of and withdrawn from the rotary knife and the remaining foam slab is guided along a path to remove the knife from the thickness of the foam slab that has been cut. Preferably the foam slab is guided in a manner to essentially limit movement of the slab to the predetermined path and cutting of the foam rod from the slab is done in a manner to cause the slab to split adjacent the rotational knife to allow separation of the rod from the slab by guiding the foam slab to one side of the cutter while the rod passes through the bore of the rotational knife. This process allows the cutting of rods from the thickness of the foam slab and guides the foam slab after the rod has been cut therefrom in a manner to separate the slab from the rod and avoid the slab hitting the support of the rotational knife. Preferably the length of the rotary knives should be kept relatively short to reduce any deflection of the knife in the length thereof.

The apparatus for cutting cylindrical rods from blocks or sheets of open cell foam on a continuous basis comprises means for moving a length of foam along a predetermined path, guide means for restricting movement of said foam to said predetermined path, at least one rotary cutter having an open bore with the axis thereof generally along said predetermined path and in a position to continuously cut a rod from the thickness of such foam as it moves past said cutter, means for rotating said cutter at a speed sufficient to cut the foam slab effectively as such foam slab is moved along the predetermined path, means for positively withdrawing a cut rod from the cutter bore, means for slitting a surface of such foam slab to expose a portion of said cutter and guide means engaging such foam adjacent the cutters and forcing such foam to move past one side of said cutter by passing said cutter through the slit in such foam and causing separation of the cut rod from the foam slab with the foam slab being diverted from the predetermined path.

BRIEF DESCRIPTION OF THE DRAWINGS

Preferred embodiments of the invention are shown in the drawings wherein:

FIG. 1 is an end view of a foam slab showing the outline of a number of cylindrical rods to be cut therefrom;

FIG. 2 is a perspective view illustrating the foam slab and cylindrical rods within the thickness of the foam slab;

FIG. 3 is a perspective view of the cylindrical rod desired to be cut from the foam slab;

FIG. 4 is a side view of a portion of the apparatus used in the cutting of the cylindrical backer rods;

DESCRIPTION OF THE PREFERRED EMBODIMENTS

Figures 5, 6:
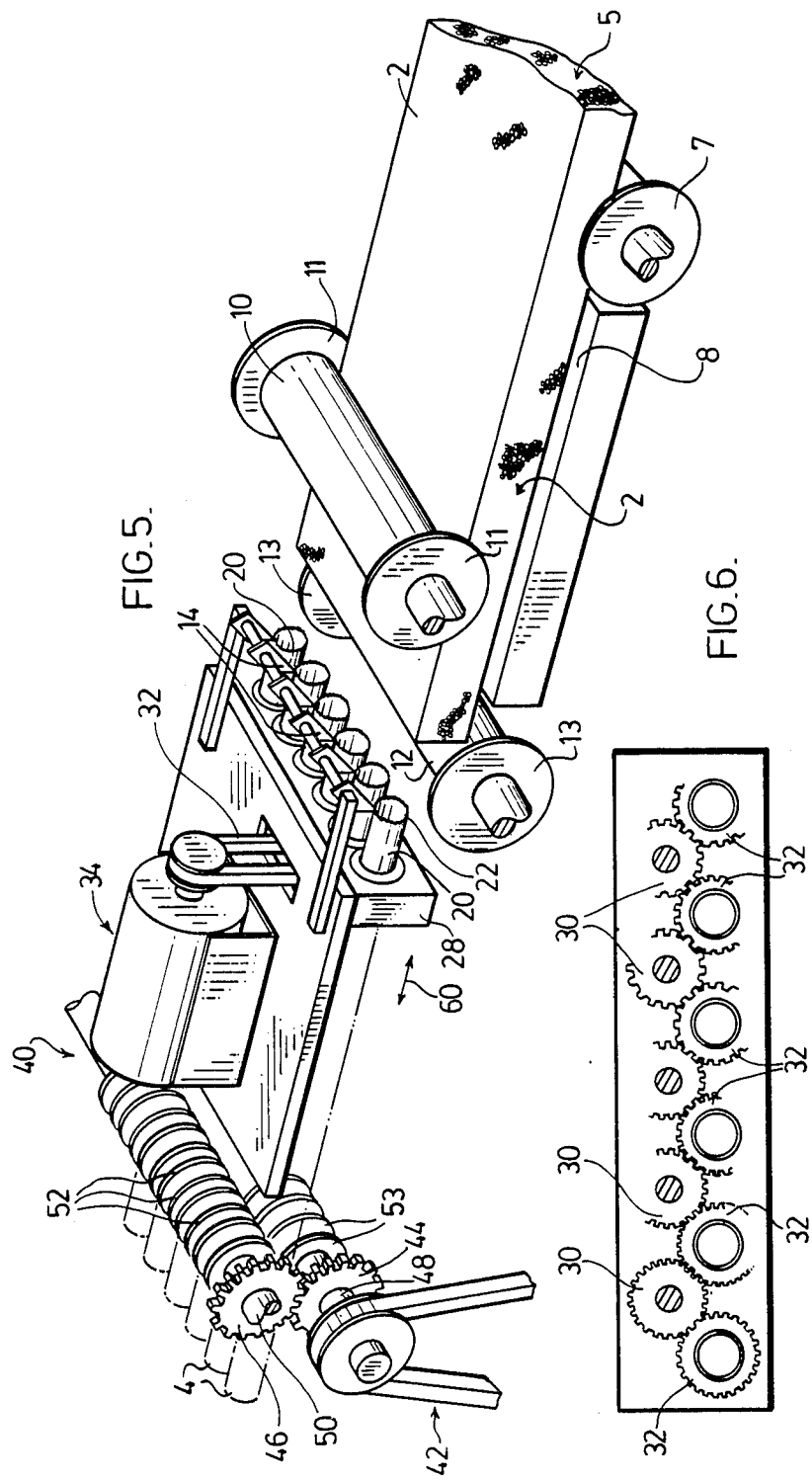
FIG. 5 is a partial perspective view showing further details of the cutting station and the path along which the foam slab is moved.
FIG. 6 is a view of the drive arrangement used for the cylindrical cutters.

As shown in FIGS. 1 through 3, the purpose of the present apparatus and process is for forming of the cylindrical backer rods generally shown as 4 from open cell foam slab 2 of a soft flexible polymeric foam. The slab 2 is moved along a predetermined path generally indicated as 5 and is guided along this path by rollers 6, 10 and 12 in combination with the flat bed generally indicated as 8. Preferably, rollers 10 and 12 merely move in response to movement of the foam block 2 and a drive for pushing the foam slab towards the rotary cutters generally indicated as 20 is provided upstream of rollers 6, 10 and 12. Rollers 6, 10 and 12 extend across the width of the foam slab 2 and include extension surfaces 7, 11 and 13 respectively for engaging an edge of the foam block to maintain the foam slab 2 laterally as it is moved towards the rotary cutter 20. It is important to maintain the position of the foam slab as it is being cut and moved past the rotary cutter 20 and this is accomplished by roller 12 which is essentially adjacent the cutter 20 with roller 10 being slightly upstream of roller 12. The foam slab 2 does have some rigidity and this will be sufficient to avoid the slab bulging upwardly between the cutter 20 and the area of the foam between roller 10 and the cutter.

The rotary cutter 20 is positioned within the thickness of the foam and has a cutting edge 22 which will cut the foam slab along cut line 3 of FIG. 1 to form the cylindrical backer rod indicated as 4. The cylindrical backer rod will pass through the center bore 24 of the rotary cutter 20 and is shown exiting the rear of the cutter in FIG. 4. In this way the cylindrical rod 4 formed in FIG. 4 has been separated from the remaining portion of the slab labelled 2a in FIG. 4. The knife 14 provides a slit in the upper surface of the slab 2 and allows the slab to be forced downwardly over the rotary cutter to completely separate the backer rod 4 from the remaining portion of the slab 2a. Knife 14 is placed adjacent the rotary cutter 20 and in some cases may not be required. For example, the thickness of the foam remaining between the rotary cutter 20 and the upper surface of the foam slab 2 may be such that the remaining portion of the foam slab 2a rips as it is moved downwardly over the rotary cutter and past the support therefore, due to guide roller 15. Knife 14 is supported by member 36 adjacent cutting edge 22. To the rear of the cutting edge 22, the rotary cutter 20 is supported in a bearing 26 which is in turn supported in a support block 28. To the rear of the rotary cutter 20 a drive pulley 30 is provided which is in contact with drive belt 32 driven by drive arrangement 34. The speed of the rotary cutter 20 can vary in accordance with the speed of the movement of the foam along bed 8 and characteristics of the foam and the rotary cutter. The arrangement of rollers 10 and 12 is such that the movement of the foam is restricted to maintain the cutter 20 within the thickness of the foam and thereby assuring formation of the cylindrical backer rod 4.

An apparatus for cutting a plurality of cylindrical backer rods from a slab of soft flexible foam is shown in FIG. 5. In this case, a number of rotary cutters 20 have been ganged together and have a gang drive train generally as shown in FIG. 6. This allows the single drive 34 to be used for all of the cutters 20. Each of the cutters 20 has an associated cutting knife 14 for slitting the upper surface of the foam slab to allow the slab to move past the cutters after cutting of the cylindrical rods.

FIG. 5 also illustrates how the guide surfaces 7, 11 and 13 of rollers 6, 10 and 12 effectively limit movement of the foam slab 2 to the predetermined path indicated by arrow 5. The plurality of cylindrical backer rods cut from the foam block 2 are shown at the extreme left side and include an engaging and withdrawing arrangement 40 for contact with the cylindrical rods 4 to apply tension to the rods 4 between the cutting edge 22 of each of the rotational cutters and arrangement 40. This tension on the rods 4 assures the cylindrical rods do not rotate in sympathy with the rotational cutters 20, due to frictional engagement with the walls thereof, and also serves to produce a slight temporary necking in the diameter of the cylindrical rods further reducing any frictional forces between the cutters and the associated cut rods. This tension is produced by using paired engaging disks 52 and 53 either side of the cylindrical rod which positively engage the rod and are driven by the drive arrangement 42 to apply tension to the rod. The drive arrangement 42 is connected to these members 52 and 53 via shaft 48 which directly carries members 53 and shaft 50 which carries member 52 operatively driven by gear 44 and gear 46 with gear 46 directly secured to shaft 50. In this way, control of the cut cylindrical rods is achieved and the tendency of the cylindrical rods to rotate with the cutters is reduced. Tension of the rods can be achieved by driving disc members 52 and 53 at a speed to pull the rods 4 at a linear speed slightly greater than the linear feed speed of the foam slab 2 and allowing limited slippage of the rods between the discs. This problem of rotation of the cylindrical rods can also be reduced by keeping the length of the cutters fairly short. The rotational cutters shown are of cylindrical construction, however these can also be in the form of conical cutters having increasing diameter in the direction of travel of the foam. This increasing diameter obviously will reduce the frictional engagement of the cut rod 4 with the rotational cutters, thereby reducing the need to pull the cut rod 4 out of a cutter 20.

A simple arrangement for driving the rotational cutters 20 by use of the one drive arrangement 34 is shown in FIG. 6 which includes a plurality of drive gears 32 each secured to a cylindrical cutter. Each of these drive gears 32 is interconnected to an adjacent cutter gear by an intermediate gear 30. By driving any cylindrical cutter or one of the intermediate gears 30, all cylindrical cutters will rotate.

Returning to FIG. 5, the cylindrical cutters 20 are each supported within a support block 28 which is mounted to be movable as indicated by arrows 60. This allows the cutters to be positioned out of engagement with the foam to allow feeding of the foam slab through the apparatus and when desired to be moved to a cutting position such that a cylindrical rod is cut from the thickness of the foam prior to the remaining portion of the foam being drawn across the cutters as it is diverted from the predetermined path.

Figure 7:
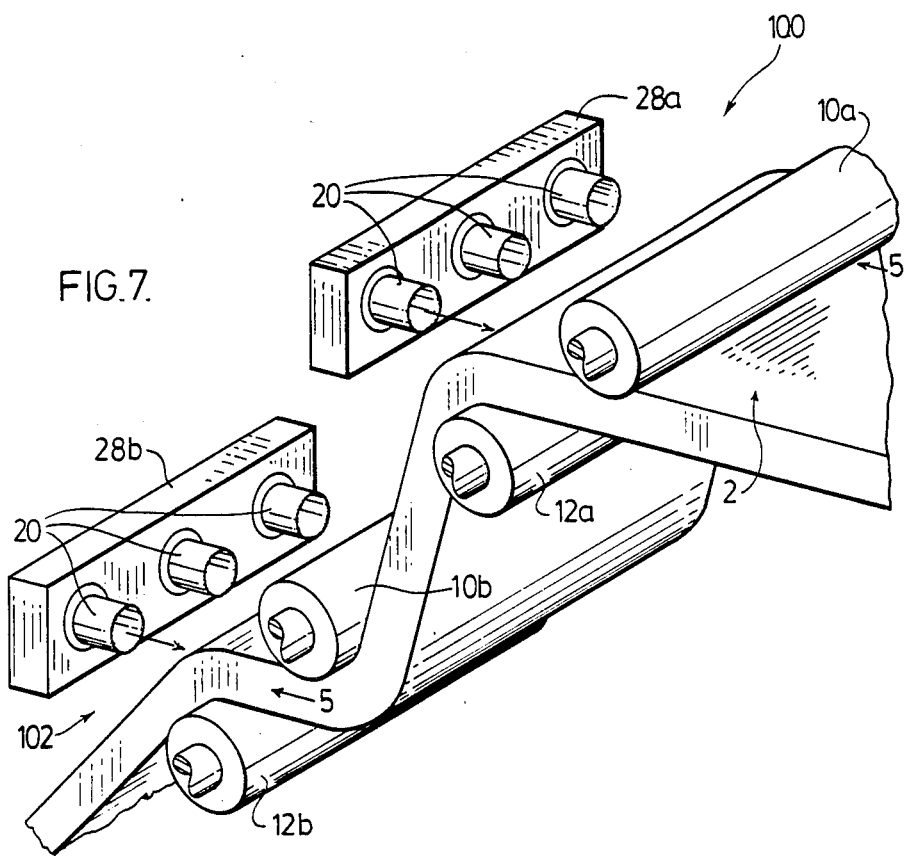
FIG. 7 is a partial perspective view showing a two stage cutting operation where a first set of cylindrical rods are cut followed by a second cutting operation.
Figure 8:
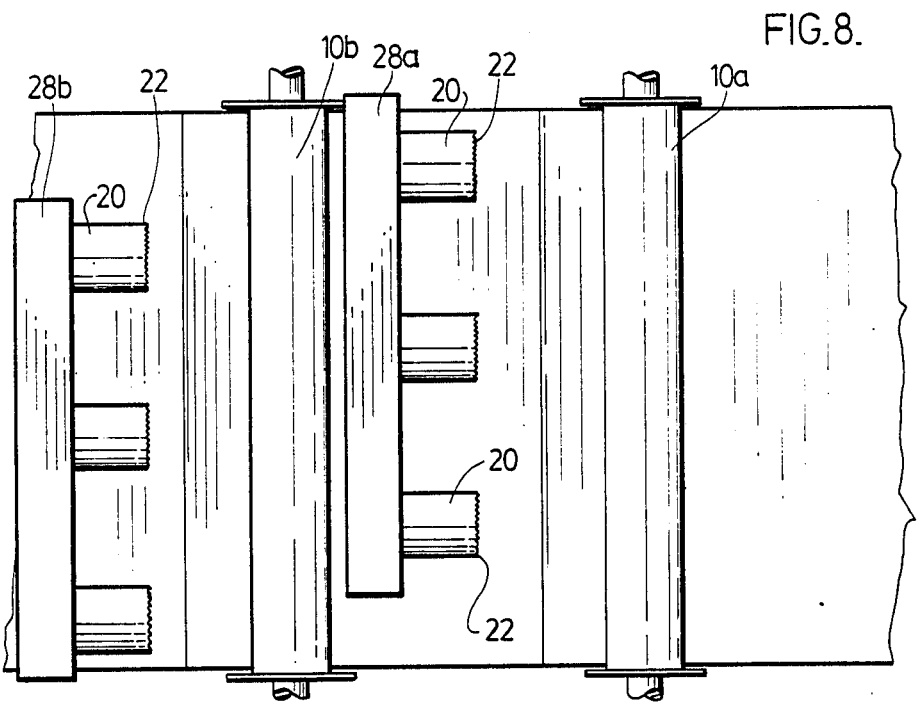
FIG. 8 is a top view of such a two stage cutting operation.

FIGS. 7 and 8 illustrate a two stage application where the foam slab 2 first has one set of cylindrical backer rods cut therefrom each of which is spaced from another by a distance greater than the diameter of such a cylindrical backer rod. The first stage of the cutting is generally indicated as station 100 with a second cutting operation indicated as station 102. Each set of rotary cutters is moveable into the path of the foam adjacent a lower support roll with a further roller placed upstream such that movement of the foam at the cutter is limited to the predetermined path over which the foam is forced. As illustrated in FIG. 8, each of the rolls can include guide surfaces for engaging the edge of the foam and maintaining the position of the foam with respect to the lateral direction. The first set of cylindrical knives are supported in a common block 28a and the second set of cylindrical knives are supported in common block 28b. The rollers for the first station are indicated as 10a and 12a and the rollers for the second station are indicated as 12b and 10b. This two stage operation may be of benefit where placement of cylindrical knives closer to one another is difficult or in the case where conical cutters are used. If the foam slab is of insufficient rigidity during the second stage cutting due to removal of the rods at the first stage stationary plugsd can be used to fill the area of the foam slab from which the rods have been removed at least adjacent the second set of cutters. The slab can move past such plugs due to the slit previously formed at the first set of cutters.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A continuous process for cutting a generally cylindrical rod from soft flexible polymeric foam in the form of an elongate slab of predetermined width and thickness including moving the foam slab along a predetermined path towards high speed circular cutters spaced in the width of said slab and spaced from each other, continuously cutting from within the thickness of such slab a plurality of rods each spaced in the width of such foam a distance at least equal to the diameter of such rods as such slab moves past at least some of said cutters and cutting said foam between said rods and the upper or lower surface of such slab, moving the remaining portion of such foam along a second predetermined path past further circular cutters positioned to cut additional rods from the remaining portion of such foam slab spaced by a distance approximately equal to the diameter of one of such rods and forcing the remaining portion of such slab to separate from such cut additional rods by moving in a manner such that the remaining portion of such slab is displaced sufficiently from said path and said cut additional rods such that such rods are exterior to such slab.

2. A process as claimed in claim 1 including withdrawing such rods from said cutters under tension to stretch such rods within said cutters reducing the diameter of such rods thereby reducing the frictional forces between such rods and said cutters within said cutters.

3. A process as claimed in claim 1 wherein the portion of such foam slab immediately downstream of the location of cutting such rods is guided along a different predetermined path to remove said cutters from such foam slab while such rods pass through said cutters.

4. A process as claimed in claim 3 wherein guiding such foam slab adjacent and upstream of said cutters includes passing the foam slab between two opposed pressure rollers each including surfaces for engaging such foam slab either side thereof and maintain the lateral position of such foam slab relative to said predetermined path of travel.

5. A process as claimed in claim 4 wherein said opposed pressure rollers are spaced along the predetermined path and generally thereacross to provide a limited region where such foam slab is restricted and supported and cutting such foam slab as such limited region.

6. A process as claimed in claim 5 including removing such foam slab from said cylindrical cutters immediately subsequent to cutting of such rods by guiding such foam slab about a large roller which support such foam slab during cutting such rods and at least partially guides such foam slab to said second path after cutting of such rods.

7. An apparatus for the continuous cutting generally cylindrical rods from soft flexible polymeric foam slab comprising
    means for continuously moving a length of soft flexible foam slab along a predetermined path,
    guide means for restricting the movement of such foam slab to movement along said predetermined path,
    a plurality of rotary cutters each having an open bore with the axis thereof generally along said predetermined path and in a position to continuously cut a rod from the thickness of such foam slab as it is moved past said cutter,
    means for rotating said plurality of rotary cutters at a speed sufficient to cut rods from such foam slab effectively as such foam slab is moved along said path,
    means for continuously positively withdrawing cut rods from said cutter bores,
    said guide means engaging such foam slab adjacent said cutters and forcing such foam to move past and beyond said cutters, such foam slab in moving past and beyond said cutters being slit to allow such cut rods to continue along such path and said guide means engaging such foam slab other than such rods and diverging the same from said path and away from said cutters.

8. An apparatus as claimed in claim 7 wherein said means for withdrawing such rods pulls on such rods to stretch the same between said cutters and said withdrawing means to reduce frictional engagement of each rod with the bore of one of said cutters.

9. An apparatus as claimed in claim 7 including
    a cutting blade associated with each cutter for slitting of such foam slab between said cutter and an edge of such foam slab to allow such foam to diverge from said predetermined path after cutting of a portion of such rod therefrom.

10. An apparatus as claimed in claim 7 wherein said means for moving such soft foam slab along said predetermined path includes drive rollers positioned across said predetermined path and contacting such foam slab with sufficient pressure to impart movement of such foam slab along said predetermined path with the appropriate rotation of said rollers.

11. An apparatus as claimed in claim 7 wherein each of said rotational cutters is cylindrical and of a length about four inches, said means for withdrawing a rod from said cutter necks the portion of such rod within said cutter to reduce the tendency of the rod to rotate with said cutter.

12. An apparatus as claimed in claim 7 wherein said cutter is conical and positioned to increase in diameter in the direction of said predetermined path.

13. An apparatus as claimed in claim 7 having a plurality of rotational cutters ganged together in a single support and including a common drive means for driving of said cutters.

14. An apparatus as claimed in claim 7 wherein said means for withdrawing includes opposed pinch rollers immediately downstream of said cutters driven at a speed to tension the portion of such rods within said cutters.

15. An apparatus as claimed in claim 13 wherein said cutters are mounted for movement generally parallel to said predetermined path from an operating position to cut such rods from the thickness of such foam slab to a fully withdrawn position out of engagement with such remaining foam slab.

16. An apparatus as claimed in claim 7 wherein said guide means adjacent said cutter includes a cylindrical roller orientated across said predetermined path and tangential therewith, said roller in combination with a further roller located downstream and below said cylindrical roller causing the portion of foam slab other than such rods to quickly move across an exterior surface of said cutters to a different predetermined path.

* * * * *